United States Patent [19]
DeVilbiss et al.

[11] Patent Number: 5,690,849
[45] Date of Patent: Nov. 25, 1997

[54] CURRENT CONTROL CIRCUIT FOR IMPROVED POWER APPLICATION AND CONTROL OF THERMOELECTRIC DEVICES

[75] Inventors: Roger S. DeVilbiss, Dallas; Tony M. Quisenberry, Highland Village, both of Tex.; Harry C. Powell, Shipman, Va.

[73] Assignee: Thermotek, Inc., Carrollton, Tex.

[21] Appl. No.: 607,713

[22] Filed: Feb. 27, 1996

[51] Int. Cl.$^6$ .................................................. H05B 1/02
[52] U.S. Cl. .................. 219/497; 219/501; 219/209; 219/505; 62/3.2; 62/3.7; 363/78
[58] Field of Search .................. 219/481, 488, 219/501, 497, 499, 505, 507–509, 209, 210; 363/89, 78–84; 62/3.2, 3.3, 3.7

[56] References Cited

U.S. PATENT DOCUMENTS

| | | | |
|---|---|---|---|
| 2,416,152 | 2/1947 | Braun | 165/185 |
| 2,713,655 | 7/1955 | Grubman | 165/185 |
| 3,584,291 | 6/1971 | Budniak et al. | 323/236 |
| 3,612,970 | 10/1971 | Sofan | 318/721 |
| 3,967,627 | 7/1976 | Brown | 128/400 |
| 4,187,535 | 2/1980 | Wigley et al. | 363/16 |
| 4,301,658 | 11/1981 | Reed | 62/3.7 X |
| 4,459,468 | 7/1984 | Bailey | 219/490 |
| 4,587,563 | 5/1986 | Bendell et al. | 358/213 |
| 4,680,445 | 7/1987 | Ogawa | 219/299 |
| 4,833,888 | 5/1989 | Kerner et al. | 62/3.3 |
| 4,844,072 | 7/1989 | French et al. | 128/400 |
| 4,935,864 | 6/1990 | Schmidt et al. | 363/141 |
| 5,030,898 | 7/1991 | Hokanson et al. | 318/146 |
| 5,035,052 | 7/1991 | Suzuki et al. | 29/890.046 |
| 5,043,560 | 8/1991 | Masreliez | 219/497 |
| 5,097,829 | 3/1992 | Quisenberry | 128/400 |
| 5,128,517 | 7/1992 | Bailey et al. | 219/506 |
| 5,128,854 | 7/1992 | Raets | 363/89 |
| 5,172,689 | 12/1992 | Wright | 128/400 |
| 5,174,121 | 12/1992 | Miller | 62/3.7 |
| 5,190,032 | 3/1993 | Zacol | 128/400 |
| 5,197,294 | 3/1993 | Galvan et al. | 62/3.62 |
| 5,213,152 | 5/1993 | Cox | 165/5 |
| 5,371,665 | 12/1994 | Quisenberry et al. | 363/89 |

FOREIGN PATENT DOCUMENTS

| | | |
|---|---|---|
| 4036210 | 5/1992 | Germany . |
| 0188855 | 11/1982 | Japan . |

*Primary Examiner*—Mark H. Paschall
*Attorney, Agent, or Firm*—Jenkens & Gilchrist, a Professional corp.

[57] ABSTRACT

A current control circuit for improved power application and control of thermoelectric devices to maintain the temperature of thermoelectric devices at a set point. The circuit includes at least one thermoelectric device, an inductor device, a current sensor and a switch device operatively connected in a series connection across a pair of terminals to allow current to flow therethrough when the switch device is activated to the "on" condition; a temperature sensor operatively positioned to monitor the temperature associated with the at least one thermoelectric device; a comparator device receives an input from the current sensor and provides an output to the switch device; a programmable control device receives an input from the temperature sensor and provides an output to the comparator device, the value of the output is determined by the difference between the sensed temperature of the at least one thermoelectric device and the desired set point temperature of the at least one thermoelectric device. The comparator device activates and deactivates the switch device, determined by the output of the programmable control device, to allow current to flow through the at least one thermoelectric device to achieve the set point temperature.

19 Claims, 2 Drawing Sheets

CURRENT CONTROL CIRCUIT FOR IMPROVED POWER APPLICATION AND CONTROL OF THERMOELECTRIC DEVICES

BACKGROUND OF THE INVENTION

1. Field of the Invention

The present invention relates to thermoelectric cooling devices, and more particularly, but not by way of limitation, to a power supply and control circuit incorporating an improved design for supplying power to thermoelectric cooling devices and improved temperature control of the thermoelectric cooling devices.

2. History of the Prior Art

The development of thermoelectric cooling (TEC) devices has revolutionized the cooling industry. Conventional cooling has typically required the expansion and compression of gases, such as Chloroflorocarbons (CFC's) and Hydrochloroflorocarbons (HCFC's) to effect the absorption of heat for lowering the temperature of a fluid flowing in association therewith. Unfortunately, these substances are damaging to the earth's ozone layer and are being phased out in future years. The development of solid state cooling systems in the form of TEC devices, has permitted small commercial packages to be developed that are capable of precise temperature control in a variety of applications where environmental concern, size, weight, performance, and noise are at issue.

The most typical TEC device incorporates a thermoelectric module/component that utilizes electrical current to absorb heat from one side of the module and dissipate the heat on the opposite side. If the current direction is reversed, so is the heat pumping. Generally, cold sides and hot sides are developed necessitating an effective means of removing or adding heat from or to a solid, liquid or a gas (typically air).

One of the most ubiquitous problems in the area of industrial control is that of temperature regulation. Variations in ambient temperature, process loading, and power input must all be accounted for in such a manner that the controlled system will reach an equilibrium point in a reasonable time, and oscillations in temperature will be minimized. There are two generally used control methods or systems to accomplish this end: Thermostatic Control and Proportional-Integral-Derivative (PID) control.

The simplest method or system is thermostatic control which is exemplified by a typical home thermostat. In this system, full power is applied to the thermal generator until the desired set point is reached, whereupon the power is removed and the system "coasts" back below the set point. This system is characterized by temperature fluctuations above and below the set point but is extremely economical to implement.

The second method or system is PID and is the most common form of industrial temperature control. In this method, the output of the thermal generator is regulated in a linear fashion, such that just enough power is supplied to the load to make up for losses in the system. The amount of power applied to the load is computed from three factors, hence the three (3) elements of the term PID. The first factor is the proportional term, which is a measure of the error at any particular instant. This temperature error is multiplied by the proportional gain factor and applied in a direction such as to reduce the total error. The second factor is the integral term which is simply the time integral of the temperature error. The integral term is used to "help" the proportional term in driving the temperature error to zero. The third factor is the derivative term and is calculated as the rate of change of the temperature and is used as a "brake" on the other two terms when the temperature is changing rapidly. These three terms are added algebraically to give the final power input value to the thermal generator. This system is capable of giving excellent temperature control where the heat load is essentially constant but requires that the temperature be known to a high degree of resolution in order to make use of the various gain terms.

Prior art systems for providing power to thermoelectric cooling devices typically apply a fixed voltage to the thermoelectric cooling device or module and the thermoelectric cooling device will draw the appropriate amount of current. However, many times the $V_{max}$ of the thermoelectric system is lower than that which can be easily applied with an AC line. In addition, if a DC buss is supplied for the thermoelectric devices, pulse width modulation is typically used which tends to add in an AC component which warms the hot side of the thermoelectric device thereby making the system less efficient.

For example, in U.S. Pat. No. 5,371,655, the pulse position power supply applies a variable voltage across the thermoelectric module. This approach is ideal for systems with a $V_{max}$ greater than 90 volts DC since the AC line is used to provide voltage to the thermoelectric devices and the thermoelectric devices will draw the appropriate amount of current. However, if the $V_{max}$ of the thermoelectric system is less than 90 volts DC, then the power factor becomes unacceptable and results in higher currents.

In prior art systems using switching power supplies, a transformer is used to drop the voltage to an acceptable level and a DC signal is pulse modulated for power control. This approach requires an expensive transformer and results in higher costs and less efficiency than the system of the present invention.

It would be advantageous to improve the temperature control of thermoelectric cooling devices while reducing the number of parts and reducing the cost of providing improved temperature control.

The present invention provides an improvement over the prior art by eliminating a bulky and expensive transformer while providing high efficiency and a good power factor at less expense over a wide range of $V_{max}$.

The present invention provides an improvement over the prior art by allowing greater flexibility in the number of TEC devices which can be used in various configurations (series, parallel or a combination of series/parallel) for a given input DC voltage or a regular AC line voltage because the present invention controls the current through the TEC devices rather than the voltage across the TEC devices.

SUMMARY OF THE INVENTION

One aspect of the present invention comprises a low cost, highly efficient thermal regulation system for enclosures utilizing direct current power.

Another aspect of the present invention comprises a low cost, highly efficient thermal regulation system for enclosures utilizing alternating current power.

Another aspect of the present invention comprises a current control circuit for improved temperature control of thermoelectric devices to maintain the temperature of thermoelectric devices at a set point. The circuit includes an inductor for filtering the current through the thermoelectric device or devices, a current sensor to detect the charging and discharging of the inductor and a comparator to compare a control signal with the sensed current signal to control the amount of current through the thermoelectric device or devices.

Another aspect of the present invention comprises a series connection of the thermoelectric device, an inductor, a current sensor and a switch means connected across a DC buss. A programmable control means receives an input from a temperature sensor operatively positioned on the thermoelectric device. The comparator means receives a control signal from the programmable control means and an input from the current sensor and activates the switch means for a predetermined time, determined by the control signal, to allow DC current to flow through the thermoelectric device to achieve or maintain a set point temperature with respect to the thermoelectric device.

Another aspect of the present invention comprises a bridge rectifier and filter capacitor to provide the DC voltage for the current controlled power supply. The filter capacitor can be of different values for different values of $V_{max}$ for the thermoelectric device or devices.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
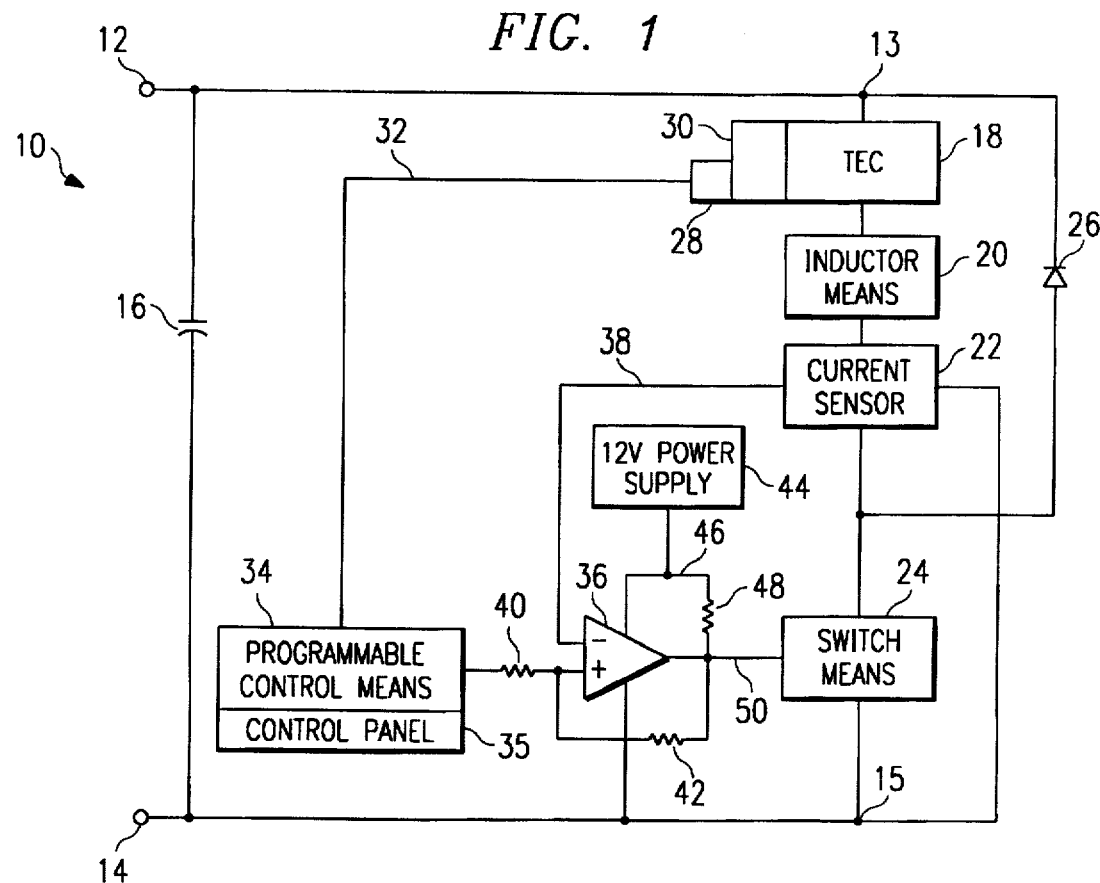
FIG. 1 is an electrical diagram of current control circuitry for DC power applications of the present invention.

Referring now to the drawings, and in particular to FIG. 1, a current control circuit according to the present invention is referred to generally by reference numeral 10. Current control circuit 10, of this particular embodiment, comprises a pair of terminals 12 and 14 for receiving a DC voltage thereacross with terminal 12 being the plus terminal and terminal 14 being the negative terminal. In one planned use of this particular embodiment, the DC voltage available is 24 volts and 48 volts but the operation of the present invention is not limited to these values. The value of the DC voltage is determined by the number and circuit configuration (series, parallel or a combination of series/parallel) of the TEC devices and vice versa. A filter capacitor 16 is connected across terminals 12 and 14. In this particular embodiment, filter capacitor may vary from 100 to 300 microfarad. The filter capacitor can be of different values for different values of $V_{max}$ of the thermoelectric devices.

A series circuit comprising one or more thermoelectric devices 18, an inductor means 20, a current sensor 22 and switch means 24 are also connected across terminals 12 and 14. In this particular embodiment, inductor means 20 comprises an iron core inductor, the current sensor 22 comprises a hall-effect sensor and the switch means 24 comprises a high current or high power transistor.

Diode 26 is operatively connected across the series circuit of one or more thermoelectric devices 18, inductor means 20 and current sensor 22 to prevent any reverse current through this series circuit.

A temperature sensor 28 is operatively attached to a heat exchanger 30 which is operatively positioned with respect to the one or more thermoelectric devices 18. A fan (not shown) is used to blow air across the heat exchanger 30 to provide the cooling air for the function desired. Temperature sensor 28 provides a signal over line or lead 32 to the programmable control means 34. The signal over line or lead 32 provides a relative indication of the temperature of the one or more thermoelectric devices 18 and the heat exchanger 30.

Inductor means 20 comprises an iron core inductor which filters the current through the series circuit including the one or more thermoelectric devices 18.

Figure 2:
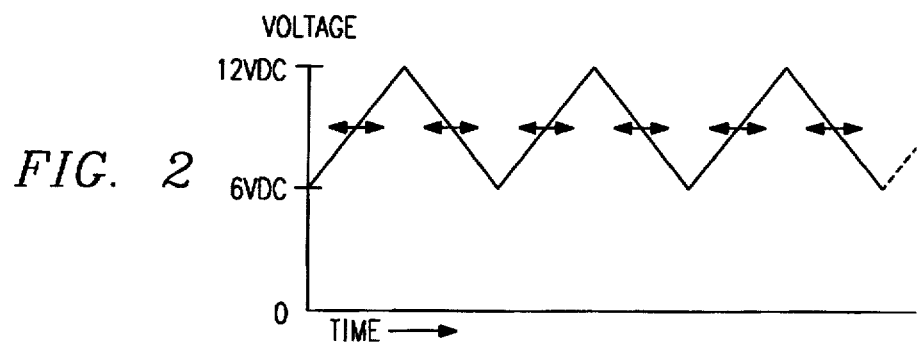
FIG. 2 is a view of the waveform of the signal from the current sensor of the present invention.

Current sensor 22 comprises a hall-effect sensor which senses the current through the series connection including the one or more thermoelectric devices 18. Current sensor 22 provides an indication, of the current flowing through the one or more thermoelectric devices 18, to the inverting input of comparator means 36 via line or lead 38. There is an offset in the current sensor 22 and at zero amps flowing through the one or more thermoelectric devices 18, current sensor 22 gives out or provides a six (6) volt signal to the inverting input of comparator means 36. At maximum current flow through the one or more thermoelectric devices 18, the output of the current sensor 22 to the inverting input of comparator means 36 is twelve (12) volts. With reference to FIG. 2, the sawtooth-type waveform, from the current sensor 22 to the inverting input of comparator means 36, is shown.

Comparator means 36 receives a signal on the inverting input from current sensor 22 via line or lead 38. The signal from current sensor 22 provides an indication of the current through the series circuit of one or more thermoelectric devices 18, inductor means 20, current sensor 22 and switch means 24. Comparator means 36 also receives a signal on the non-inverting input from programmable control means 34 through resistor 40. In essence, comparator means 36 compares the amount of cooling required to attain the set point temperature to the current flowing through the one or more thermoelectric (TEC) devices. Feedback resistor 42 is connected between the non-inverting input and the output of comparator means 36. Twelve volt power supply 44 (such as a DC—DC converter) provides twelve (12) volts to comparator means 36 on lead 46 and to the output of comparator means 36 through resistor 48. Comparator means 36 provides an output to switch means 24 to activate and/or deactivate switch means 24.

Figure 3:
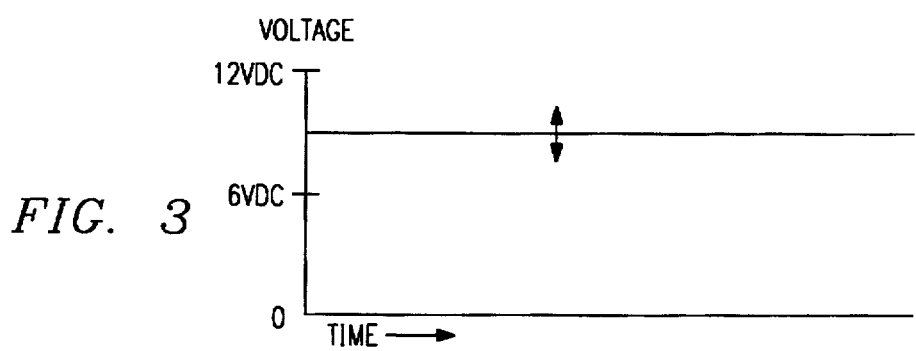
FIG. 3 is a view of the waveform of the control signal from the programmable control means of the present invention.

Programmable control means 34 comprises a microprocessor and appropriate software (such as a PID control loop) and outputs a DC control signal to the non-inverting input of comparator means 36. With reference to FIG. 3, the DC control signal is shown and will vary between six (6) volts and twelve (12) volts. Control panel 35 on programmable control means 34 allows the operator to input the desired set point temperature for the particular cooling function presently required. In the most basic embodiment, a potentiometer (not shown) could be used to input the desired set point temperature.

Figure 4:
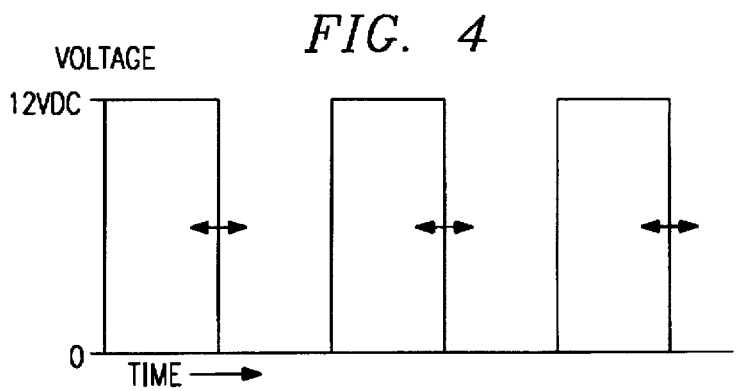
FIG. 4 is a view of the waveform of the signal which activates the switch means of the present invention.

Switch means 24 comprises a high current or high power transistor. Switch means 24 receives the output signal from comparator means 36 on line or lead 50. The output signal from comparator means 36 comprises a PWM (pulse width modulated) type signal to drive the switch means 24 and is shown in FIG. 4. Switch means 24 is activated to the "ON" or conducting condition when the approximately twelve (12) volt signal is applied to the input of the switch means 24 from the comparator means 36. When the input signal to switch means 24 goes to zero (0), switch means 24 is de-activated to the non-conducting condition.

In operation, the desired "set point" temperature is input to the programmable control means 34 at control panel 35. The proper value of DC voltage is provided or applied at terminals 12 and 14. The signal from the temperature sensor 28 sends a signal to the programmable control means 34 providing an indication that the temperature of the one or more TEC devices 18 and the heat exchanger 30 is above the "set point" temperature. Programmable control means 34 will output a DC control signal of plus twelve (+12) volts to the non-inverting input of comparator means 36 while the input to the inverting input of comparator means 36 from current sensor 22 is plus six (+6) volts. These conditions results in an output of plus twelve (+12) volts from the comparator means 36 to the input of switch means 24 thereby placing switch means 24 in the "ON" or conducting condition. Current will flow through the series connection of the one or more TEC devices 18, inductor means 20, current sensor 22 and switch means 24 and the value of the current will go from zero (0) amps to full or maximum amps while the output from the current sensor 22 to the inverting input of comparator means 36 will go or ramp-up from six (6) volts to twelve (12) volts as shown in FIG. 2.

As the current continues to flow through the one or more TEC devices 18, the output signal from the temperature sensor 28 to the programmable control means 34 will provide an indication that the temperature of the one or more TEC devices 18 and the heat exchanger 30 is approaching the "set point" temperature. At a point determined by the programmable control means 34 and the software contained therein, the control signal output from the programmable control means 34 and input to the non-inverting input of comparator means 36 will decrease to six (6) volts. This decrease in value results in the output of the comparator means 36 decreasing to zero which de-activates switch means 24 to the "OFF" or non-conducting condition. During the conduction of current through the one or more TEC devices 18, inductor means 20 charges up and retains energy and when the switch means 24 is de-activated, the inductor means 20 discharges the retained energy thereby filtering and smoothing the DC current through the one or more TEC devices 18 and providing some current stability through the one or more TEC devices.

As the temperature of the one or more TEC devices 18 and the heat exchanger 30 increases above the "set point" temperature, the signal from temperature sensor 28 will indicate this rise in temperature to the programmable control means 34. The output signal from the programmable control means 34 to the non-inverting input of comparator means 36 will be increased from six (6) volts to twelve (12) volts which will result in the output signal from the comparator means 36 to switch means 24 to increase to twelve (12) volts. Switch means 24 will be placed in the "ON" or conducting condition and current will flow through the one or more TEC devices 18 to bring the temperature back down to the "set point" temperature. This type of "ON" and "OFF" cycle of switch means 24 will continue in order to keep the temperature of the one or more TEC devices 18 and heat exchanger 30 at or near the "set point" temperature. With reference to the PWM type signal of FIG. 4, it will be appreciated that the shorter the time of current flow, the higher the frequency of the PWM type signal and the longer the time of current flow, the lower the frequency of the PWM type signal.

Figure 5:
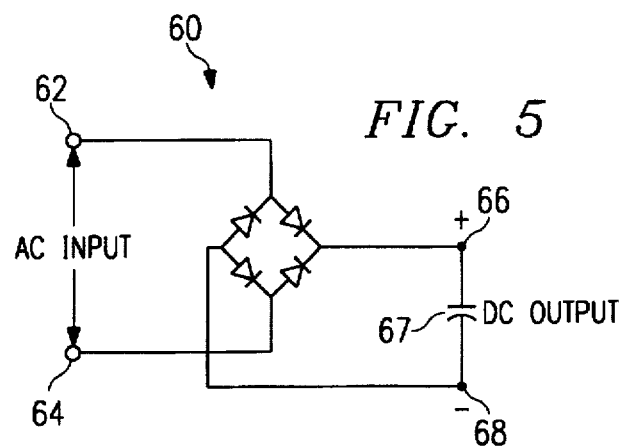
FIG. 5 is an electrical diagram of additional circuitry for AC power applications of the present invention.

With reference to FIG. 5, it will be appreciated that the present invention is not limited to only a DC power source for operation and can include a power source receiving an AC input. In the preferred embodiment, power source 60 comprises a bridge rectifier. Power source 60 receives an AC input on terminals 62 and 64 and provides an output on terminals 66 and 68, across which capacitor 67 is connected. It will be appreciated that the AC input may comprise 115 volts AC @50–60 Hz, 115 volts AC @400 Hz, 208–230 volts (also referred to herein as "about 220 volts) AC @50–60 Hz (single phase or three phase), or 208 –230 volts (also referred to herein as "about 220 volts) AC @400 HZ (single phase or three phase) with the proper interface elements, if required.

With a 115 volt AC input, the DC output on terminals 66 and 68 (which would be connected to terminals 12 and 14) would be approximately 160 DC volts. This would allow approximately eighteen TEC devices of twelve volt rating to be connected in series in the series connection shown in FIG. 1. It will be appreciated that a series/parallel combination of twelve volt TEC devices could also be used if the cooling function required additional TEC devices.

With a 220 volt AC input, the DC output on terminals 66 and 68 (which would be connected to terminals 12 and 14) would be approximately 300 DC volts. This would allow approximately twenty-five TEC devices of twelve volt rating to be connected in series in the series connection shown in FIG. 1. It will be appreciated that a series/parallel combination of twelve volt TEC devices could also be used if the cooling function required additional TEC devices.

Figure 6:
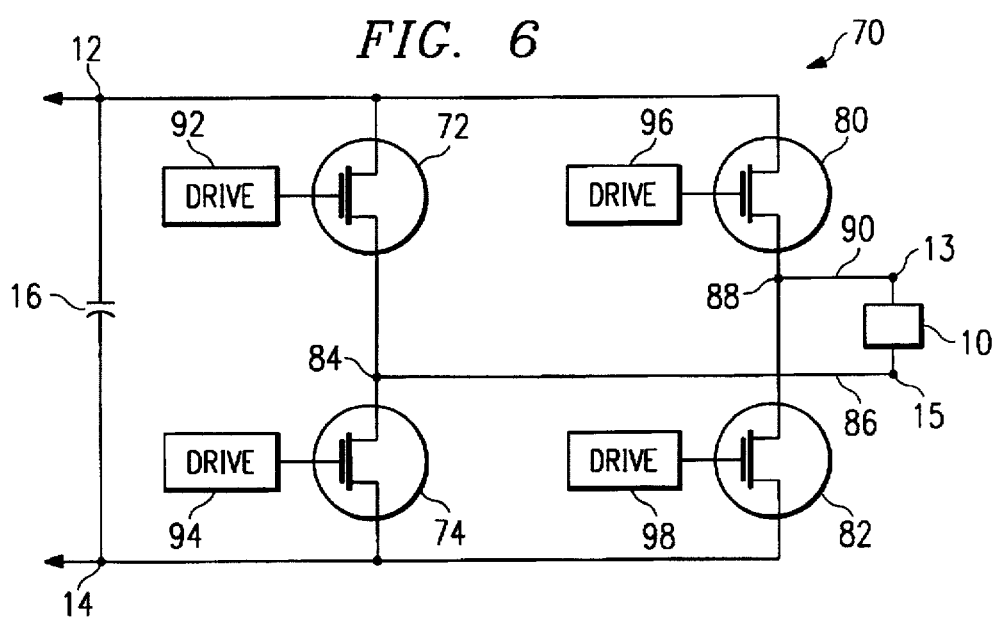
FIG. 6 is an electrical diagram of bi-polar control of a TEC device assembly utilizing the present invention.

Referring now to FIG. 6, a push-pull configuration 70 is disclosed for bi-polar control of a TEC device assembly (TEC's) utilizing the present "current control" invention. High current transistors 72 and 74 are connected in series across terminals 12 and 14. High current transistors 80 and 82 are connected in series across terminals 12 and 14. Terminal 84 between transistors 72 and 74 is connected to terminal 15 (see FIG. 1) of current control circuit 10 by line 86. Terminal 88 between transistors 80 and 82 is connected to terminal 13 (see FIG. 1) of current control circuit 10 by line 90. Drive circuit 92 provides a control input to transistor 72 while drive circuit 94 provides a control input to transistor 74. Drive circuit 96 provides a control input to transistor 80 while drive circuit 98 provides a control input to transistor 82. All the drive circuits are controlled by inputs from the programmable control means 34. When using the one or more TEC devices 18 for heating purposes, transistors 72 and 82 are placed in the conduction mode while transistors 74 and 80 are placed in the non-conduction mode. When using the one or more TEC devices 18 for cooling purposes, transistors 74 and 80 are placed in the conduction mode while transistors 72 and 82 are placed in the non-conduction mode. It will be appreciated that the programmable control means 34 controls and coordinates the drive signals to the transistors as well as the application of the voltage across terminals 12 and 14.

From the foregoing detailed description, it can be appreciated that the present invention is capable of allowing greater flexibility in the number of TEC devices which can be used in various configurations (series, parallel or a combination of series/parallel) for a given input DC voltage or a regular AC line voltage because the present invention controls the current through the TEC devices rather than the voltage across the TEC devices. The current sensor monitors the current flow which is compared with a zero (0) to a one-hundred (100) per cent cooling control signal that provides an output through the comparator to switch the high current transistor "ON" and "OFF".

While particular embodiments of the present invention have been described, it will be appreciated by those skilled in the art that various modifications, alternatives, variations, etc., may be made without departing from the spirit and scope of the invention as defined in the appended claims.

What is claimed is:

1. A current control system for a thermoelectric device to maintain the temperature of the thermoelectric device at a set point, said current control system comprising:

a pair of terminals across which a DC voltage is to be applied;

at least one thermoelectric device;

an inductor means;

a current sensor;

a switch means;

said at least one thermoelectric device, said inductor means, said current sensor and said switch means being operatively connected in a series connection across said pair of terminals to allow current to flow therethrough when said switch means is activated to the "on" condition;

a temperature sensor operatively positioned to monitor the temperature associated with said at least one thermoelectric device;

comparator means having an inverting input, a non-inverting input and an output, said comparator means receiving an input on the inverting input from said current sensor and providing an output to said switch means;

programmable control means to receive an output from said temperature sensor and to provide an output to the non-inverting input of said comparator means, the value of said output being determined by the difference between the sensed temperature of said at least one thermoelectric device and the desired set point temperature of said at least one thermoelectric device;

said comparator means activates said switch means for a predetermined time, determined by the output from said programmable control means, to allow DC current to flow through said at least one thermoelectric device to achieve the set point temperature at which time said comparator means deactivates said switch means.

2. The system as set forth in claim 1 further including filter means operatively connected across said pair of terminals.

3. The system as set forth in claim 2 wherein said filter means comprises a capacitor.

4. The system as set forth in claim 1 further including rectifying means for producing DC current from an output when receiving an input of alternating current power, said output is operatively connected across said pair of terminals.

5. The system as set forth in claim 4 wherein said input of alternating current power is about 115 volts AC @60 Hz.

6. The system as set forth in claim 4 wherein said input of alternating current power is about 115 volts AC @400 Hz.

7. The system as set forth in claim 4 wherein said input of alternating current power is about 220 volts AC @50–60 Hz.

8. The system as set forth in claim 4 wherein said input of alternating current power is about 220 volts AC @400 Hz.

9. The system as set forth in claim 4 wherein said rectifying means comprises a bridge rectifier.

10. The system as set forth in claim 1 wherein said programmable control means comprises a microprocessor and associated software.

11. The system as set forth in claim 1 wherein said switch means comprises a high current transistor.

12. The system as set forth in claim 1 wherein said current sensor comprises a hall effect sensor.

13. The system as set forth in claim 1 further including a diode operatively connected across the series connection of said at least one thermoelectric device, said inductor means and said current sensor to prevent any reverse current through said series connection.

14. A method of controlling the current through a thermoelectric device to maintain the temperature of the thermoelectric device at a set point, said method comprising the steps of:

providing a DC voltage of predetermined value across a pair of terminals;

providing an inductor means, a current sensor and a switch means connected in series with at least one thermoelectric device;

operatively connecting the series connection of said at least one thermoelectric device, the inductor means, the current sensor and the switch means across the pair of terminals;

providing comparator means having an inverting input, a non-inverting input and an output;

determining the operating temperature of said at least one thermoelectric device;

providing a voltage from the current sensor to the inverting input of said comparator means;

providing a voltage to the non-inverting input of said comparator means, the value of said voltage being determined by the difference between the determined operating temperature of said at least one thermoelectric device and the set point temperature;

activating said switch means for a predetermined time, determined by the voltage to the non-inverting input of said comparator means, to allow the DC current to flow through said at least one thermoelectric device to achieve the set point temperature at which time said comparator means deactivates said switch means.

15. The method as set forth in claim 14 further including the step of providing filter means operatively connected across said pair of terminals.

16. The method as set forth in claim 15 wherein said filter means comprises a capacitor.

17. The method as set forth in claim 14 further including the step of providing a diode operatively connected across the series connection of said at least one thermoelectric device, said inductor means and said current sensor to prevent any reverse current through said series connection.

18. The method as set forth in claim 14 wherein said switch means comprises a high current transistor.

19. The method as set forth in claim 14 wherein said current sensor comprises a hall effect sensor.

* * * * *